United States Patent [19]

Johnson et al.

[11] Patent Number: 5,310,358

[45] Date of Patent: May 10, 1994

[54] COMPUTER DOCKING SYSTEM

[75] Inventors: David C. Johnson, Winston Salem; Robert M. Renn, Pfafftown; Keith L. Volz, Jamestown; Frederick R. Deak, Kernersville, all of N.C.

[73] Assignee: The Whitaker Corporation, Wilmington, Del.

[21] Appl. No.: 995,615

[22] Filed: Dec. 22, 1992

[51] Int. Cl.$^5$ .......................................... H01R 13/627
[52] U.S. Cl. .................................... 439/358; 439/138; 439/342
[58] Field of Search .................. 439/62, 65, 66, 67, 439/138, 137, 159, 342, 352, 357, 358, 376, 929

[56] References Cited

U.S. PATENT DOCUMENTS

| | | | |
|---|---|---|---|
| 4,008,941 | 2/1977 | Smith | 439/358 |
| 4,668,036 | 5/1987 | Ota et al. | 439/159 X |
| 4,893,263 | 1/1990 | Myers | 439/352 X |
| 4,960,384 | 10/1990 | Singer et al. | 439/159 X |
| 4,979,909 | 12/1990 | Andrews | 439/352 |
| 5,103,378 | 4/1992 | Stowers et al. | 439/64 X |

OTHER PUBLICATIONS

IMB Technical Disclosure Bulletin, vol. 19, No. 11, Apr. 1977.
IBM Technical Disclosure Bulletin, vol. 33, No. 4, Sep. 1990.

*Primary Examiner*—Neil Abrams
*Assistant Examiner*—Khiem Nguyen
*Attorney, Agent, or Firm*—William B. Noll

[57] ABSTRACT

A computer docking system (10, 10') has a computer (11, 11') provided with a guide housing (12, 12') within which a device (13, 13') is slidably inserted. In one embodiment, the device (13) carries a pair of manually-releasable spring-loaded latches (24, 25) pivotally mounted thereon about respective axes which are substantially perpendicular to the direction which the device (13) is slidably inserted into the guide housing (12) for engagement with respective hooks (36) on the computer (11). In another embodiment, the latches (51, 52) are pivotably mounted on the guide housing (12') about respective axes which are substantially parallel to the direction in which the device (13') is slidably inserted into the guide housing (12'). The guide housing (12') includes a fixed bottom portion (44) on which the latches (51, 52) are pivotably mounted, and further includes a spring-loaded movable top portion (45) receiving the device (13') and ultimately nested telescopically within the fixed bottom portion (44). In each embodiment, a substantially zero insertion force ("ZIF") is achieved between at least one flexible electrical connector (41, 57, 58) and a circuit pad (43, 60, 61) as the device (13, 13') is inserted into the guide housing (12, 12').

12 Claims, 11 Drawing Sheets

COMPUTER DOCKING SYSTEM

FIELD OF THE INVENTION

The present invention relates to a computer docking system, and in particular, to a docking system in which a device is inserted into a computer.

BACKGROUND OF THE INVENTION

Main frame computers or other computer terminals have access openings for slidably receiving a portable computer, such as a notebook computer or laptop computer, for downloading data into the main frame computer or for other purposes. The notebook or laptop computer (or other device) is thereby "docked" in a docking station on the computer.

Moreover, the device could be an interchangeable hard disk drive for a desk-top or personal computer.

When the device is slidably inserted into the computer, a first rigid connector on the device is mechanically and electrically connected to a second rigid connector on the computer. One of the connectors has a plurality of pin terminals received in corresponding sockets in the other connector; and when the device is slidably removed from the computer, the pins and sockets on the respective first and second connectors are separated axially of each other.

Rather than relying on the mechanical connection between the respective rigid connectors to retain the device within the computer and preclude inadvertent jarring or lateral movement therebetween, it is very desirable for the device to be slidably inserted into the computer and to be releasably retained therein by means of a "solid" positive mechanical connection between the device and the computer.

Moreover, for high circuit density consonant with miniaturization and high product performance, it is desirable to use one or more flexible electrical connectors, each of which includes a plurality of closely-spaced circuit elements or traces suitably mounted on an elastomeric core. Typically, the traces are 3 mils wide on 7 mils centers, such that the spacing between adjacent traces is 4 mils. A complete line of high-quality flexible electrical connectors is supplied by AMP Incorporated of Harrisburg, Pa. under its registered trademark "AMPLIFLEX".

The flexible electrical connector (or connectors) are housed in a connector housing which may be mounted on a mother board in the computer. The device slidably inserted into the computer, in turn, is provided with a daughter board having at least one circuit element or pad thereon for engaging the flexible electrical connector. It is very desirable, therefore, that as the device is slidably received in the computer, that an edge of the daughter board or the circuit pad does not wipe against the flexible electrical connector, but rather that the circuit pad and flexible electrical connector are brought together with a substantially zero insertion force; otherwise, the flexible electrical connector will be inadvertently damaged.

SUMMARY OF THE INVENTION

Accordingly, it is an object of the present invention to provide a pair of manually-manipulatable resiliently-biased latches for positively, although releasably, retaining the device within the computer.

It is another object of the present invention to provide a substantially zero insertion force between a circuit pad on the daughter board in the device and a flexible electrical connector in a connector housing on a mother board in the computer.

In accordance with the teachings of the present invention, there is herein disclosed and claimed, a computer docking system including a computer, a device, and guide means between the computer and the device for slidably moving the computer and the device into a telescopic relationship therebetween. One of the computer and the device has at least one flexible electrical connector, and the other of the computer and the device has at least one circuit element engaging the flexible electrical connector. Means are provided for assuring that the flexible electrical connector engages the circuit element with an insertion force which is substantially zero. One of the device and the computer has a pair of manually-releasable spring-loaded latches pivotably mounted thereon, such that the latches automatically engage the other of the device and the computer upon completion of the slidable movement therebetween to retain the computer and the device in their telescopic relationship, and such that the latches may be manually pivoted and released to enable the device and the computer to be separated.

In one embodiment, the latches are mounted on the device for pivotal movement about respective axes which are substantially perpendicular to the direction in which the device is slidably inserted into the computer; and in another embodiment, the guide means includes a guide housing, and the latches are pivotably mounted on the guide housing about respective axes which are substantially parallel to the direction in which the device is slidably inserted on the computer.

Viewed in another aspect, the present invention provides a method of inserting a device into a computer and subsequently removing the device from the computer. The method includes the steps of providing a device and slidably inserting the device into the computer in a given direction and with a substantially zero insertion force, such that a flexible electrical connector carried by the device or within the computer is not damaged inadvertently. The method further includes the step of providing a pair of spring-loaded latches; such that once the device is fully inserted into the computer, the latches automatically engage and retain the device within the computer. Thereafter, the latches may be pivoted inwardly of the device, such that the latches are released, and thereafter the device may be slidably removed from the computer.

These and other objects of the present invention will become apparent from a reading of the following specification taken in conjunction with the enclosed drawings.

BRIEF DESCRIPTION OF THE DRAWINGS

FIG. 5 is a cross-sectional view, taken along the lines 5—5 of FIG. 1, and showing the guide means on the computer to receive the device.

FIG. 13 is a further perspective view, corresponding substantially to FIG. 9, but showing the pivoting latches squeezed together to release the latches, such that the spring-loaded top portion of the guide housing lifts upwardly, and such that the device may be slidably removed therefrom.

GENERAL DESCRIPTION OF THE PREFERRED EMBODIMENTS

With reference to FIGS. 1-5, a computer docking system 10 includes a computer 11 having a guide housing 12 for slidably receiving a device 13. The device 13 may be a notebook or laptop computer inserted into a mainframe computer 11, or the device 13 may be a hard disk drive inserted into a desk-top or personal computer 11.

The guide housing 12 is substantially rectangular, as shown more clearly in FIG. 5, and includes a top wall 14 and a bottom wall 15 joined by side walls 16 and 17, respectively. The top wall 14 has a first pair of spaced-apart inwardly-directed longitudinally-extending guide ribs 18 which are aligned with a complementary second pair of spaced-apart inwardly-directed guide ribs 19 formed on the bottom wall 15. The device 13, in turn, is also substantially rectangular and has respective sides 20 and 21 slidably guided between the complementary aligned guide ribs 18 and 19, respectively, such that the device 13 is smoothly guided within the guide housing 12 on the computer 11. The guide ribs 18, 19 are spaced from the respective side walls 16, 17 of the guide housing 12, thereby defining chambers 22 and 23, respectively, between the guide housing 12 and the device 13, again, as shown more clearly in FIG. 5.

Figure 1:
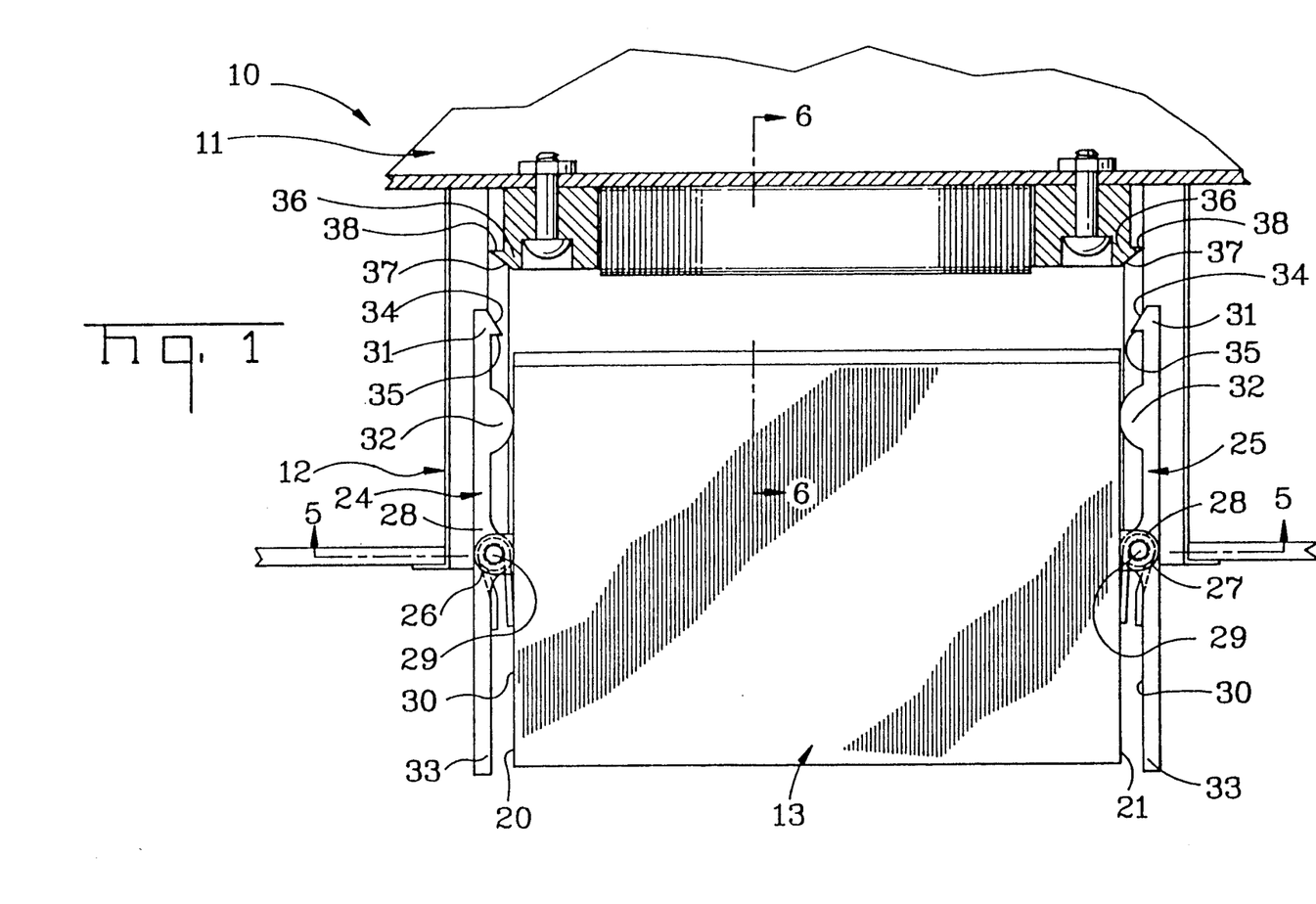
FIG. 1 is a top plan view of a first embodiment of the computer docking system of the present invention, showing a device being slidably inserted into a computer, the device carrying a pair of latches pivotably mounted thereon about respective axes which are substantially perpendicular to the direction in which the device is slidably inserted into the computer.

A pair of spring-loaded manually-releasable latches 24 and 25, respectively, is carried by the device 13. More specifically, the sides 20, 21 of the device 13 have respective bosses 26, 27; and each of the latches 24, 25 has an intermediate portion 28 pivotably mounted on a respective boss 26, 27 by a pivot pin 29. The latches 24, 25 are pivotably mounted about respective axes which are substantially perpendicular to the direction in which the device 13 is slidably inserted into the guide housing 12. A torsion spring 30 (or other suitable resilient means) is disposed between each latch 24, 25 and a respective side 20, 21 of the device 13, thereby constantly urging the latches 24, 25 into a latched or locking position.

Each latch 24, 25 further has a forwardly or inwardly-extending latch portion 31, a laterally-projecting protrusion or bump 32 between the inwardly-extending portion 31 and the intermediate portion 28, and a rearwardly or outwardly-extending manually-manipulatable latch release portion 33. The bump 32 engages a respective side 20, 21 of the device 13 to limit the pivotal movement of the respective latches 24, 25.

Each latch portion 31 includes a first inclined surface 34 having a first undercut surface 35 substantially perpendicular to the direction in which the device 13 is slidably inserted into the guide housing 12 on the computer 11. The guide housing 12, in turn, has a respective complementary hook portion 36; and each hook portion 36 has a second inclined surface 37 provided with a second undercut surface 38 which, again, is substantially perpendicular to the direction in which the device 13 is slidably inserted into the guide housing 12.

Figure 2:
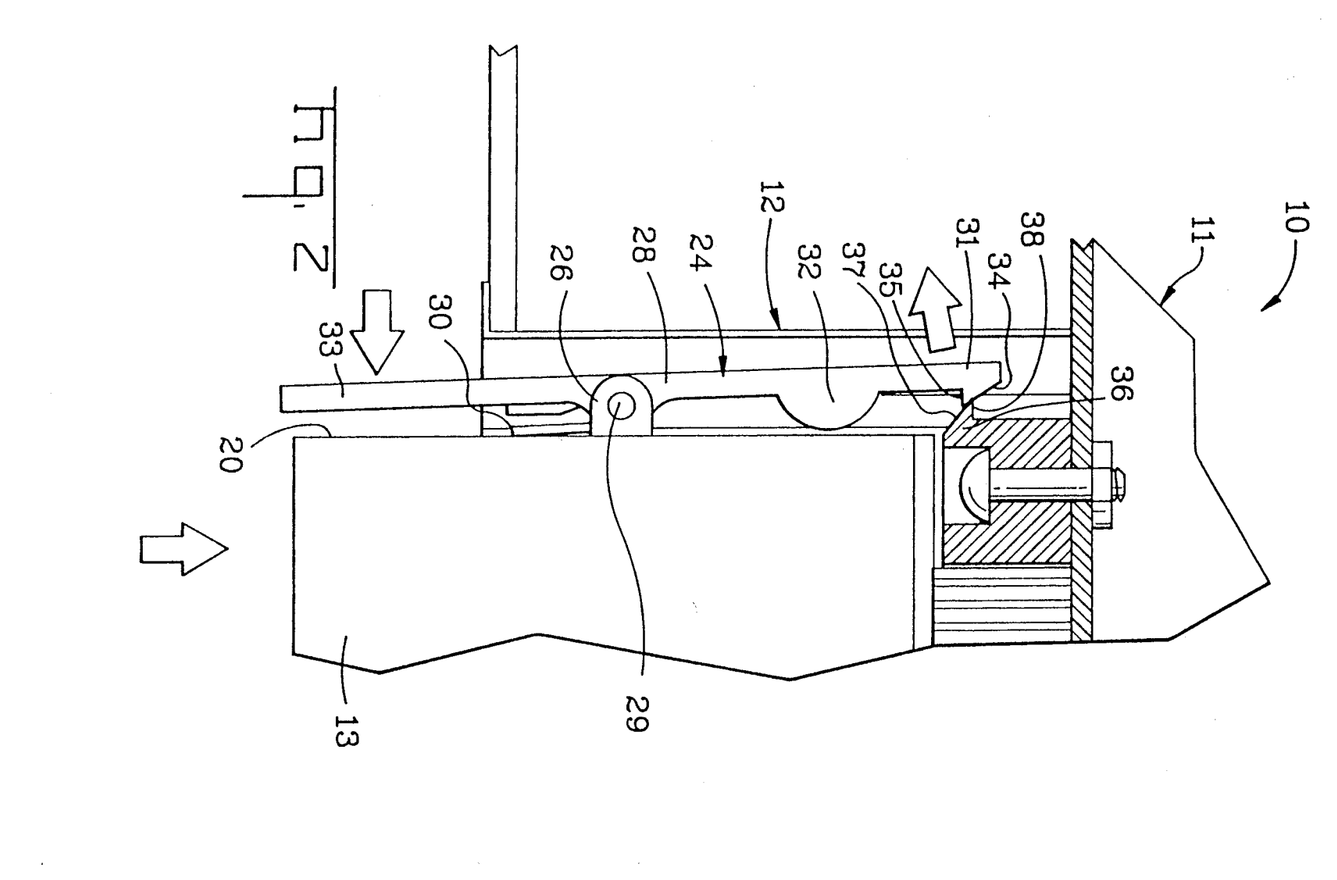
FIG. 2 is a partial top plan view, corresponding substantially to a portion of FIG. 1, but showing a latch portion on one of the pivoting latches engaging a complementary hook portion within the computer.
Figure 3:
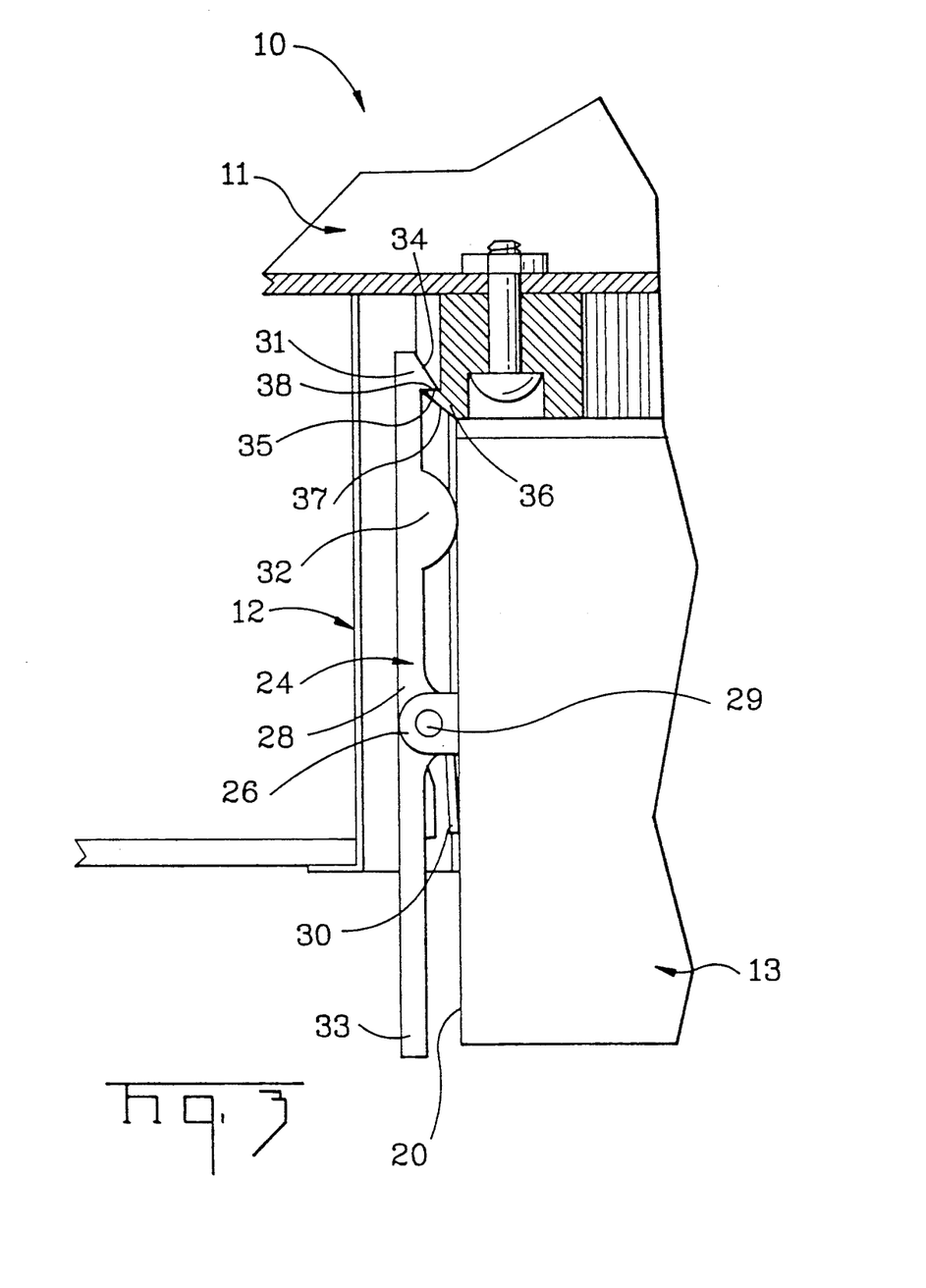
FIG. 3 is a further partial top plan view, corresponding to FIG. 2, but showing the pivoting latch engaged with its respective hook portion, thereby releasably retaining the device within the computer.
Figure 4:
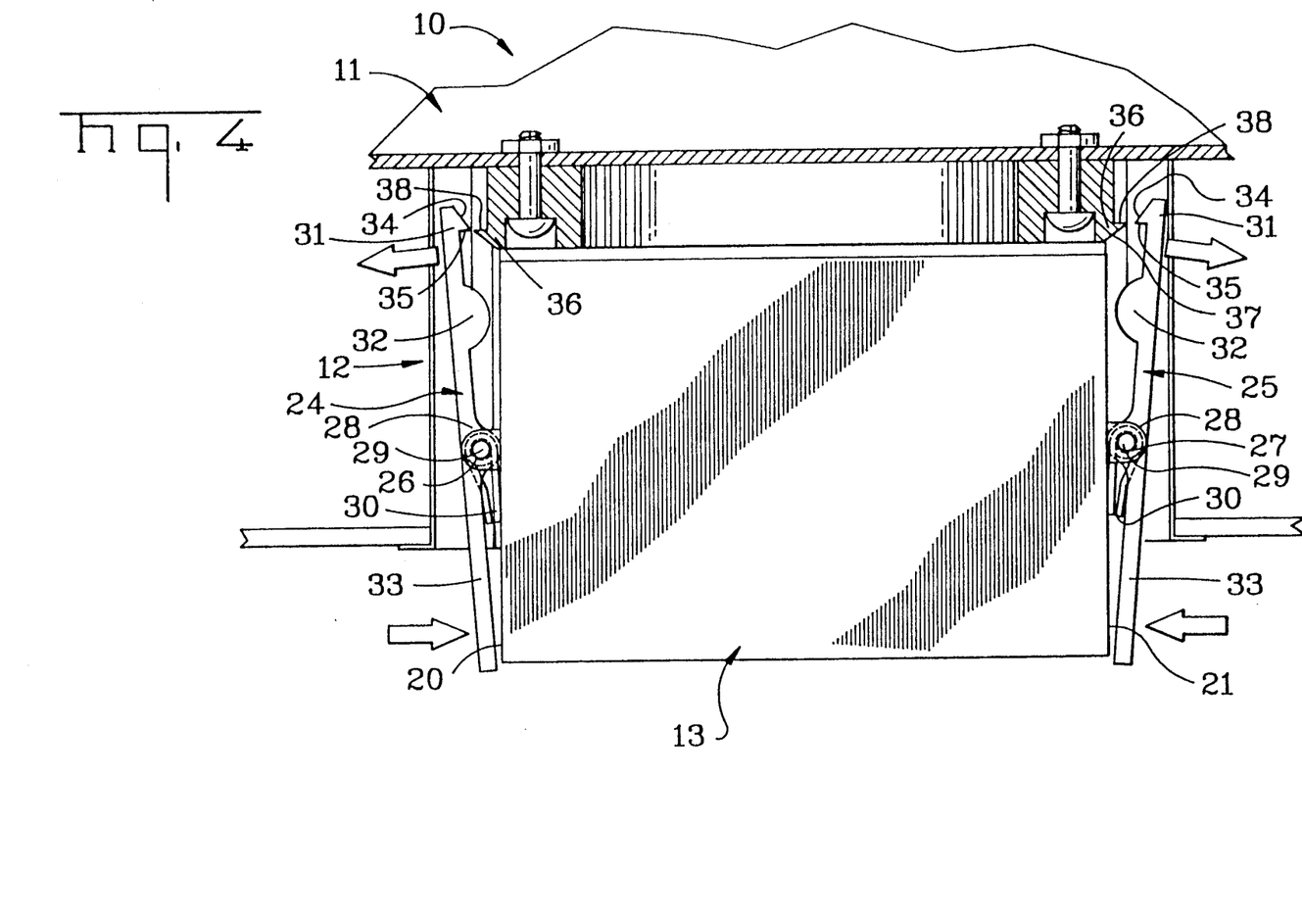
FIG. 4 is a further top plan view, showing the latches being pivoted and released to thereby enable the device to be slidably removed from the computer.

When the device 13 is slidably inserted into the guide housing 12 on the computer 11, the first inclined surface 34 on the latch portion 31 engages and rides up the second inclined surface 37 on the hook portion 36, thereby pivoting the latch 24 (or 25) in one direction (as shown more clearly in FIG. 2). As the device 13 is fully seated in the guide housing 12, the first inclined surface 34 on the latch portion 31 rides over the second inclined surface 37 and disengages therefrom, such that the first undercut surface 35 on the latch portion 31 engages the second undercut surface 38 on the hook portion 36 (as shown more clearly in FIG. 3) as the latch 24 (or 25) pivots back in a second direction opposite to the one direction and with a "snap" action, thereby removably securing the device 13 within the guide housing 12.

When it is desired to slidably remove the device 13 from the guide housing 12 on the computer 11, the latch release portions 33 of the respective latches 24, 25 are pivoted (as shown more clearly in FIG. 4) to thereby disengage each latch portion 33 from its respective hook portion 36.

Figure 6:
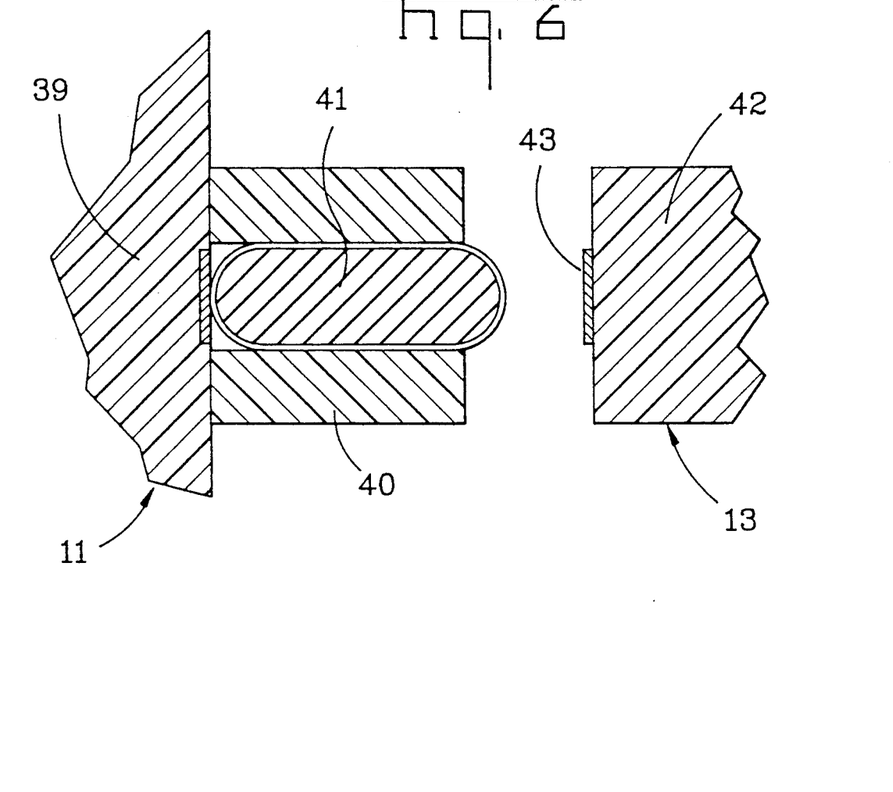
FIG. 6 is a cross-sectional view, taken along the lines 6—6 of FIG. 1, and showing the flexible electrical connector in a connector housing on a mother board in the computer, and further showing a circuit pad on a daughter board carried by the device, the circuit pad being separated from the flexible electrical connector during the insertion of the device into the computer.
Figure 7:
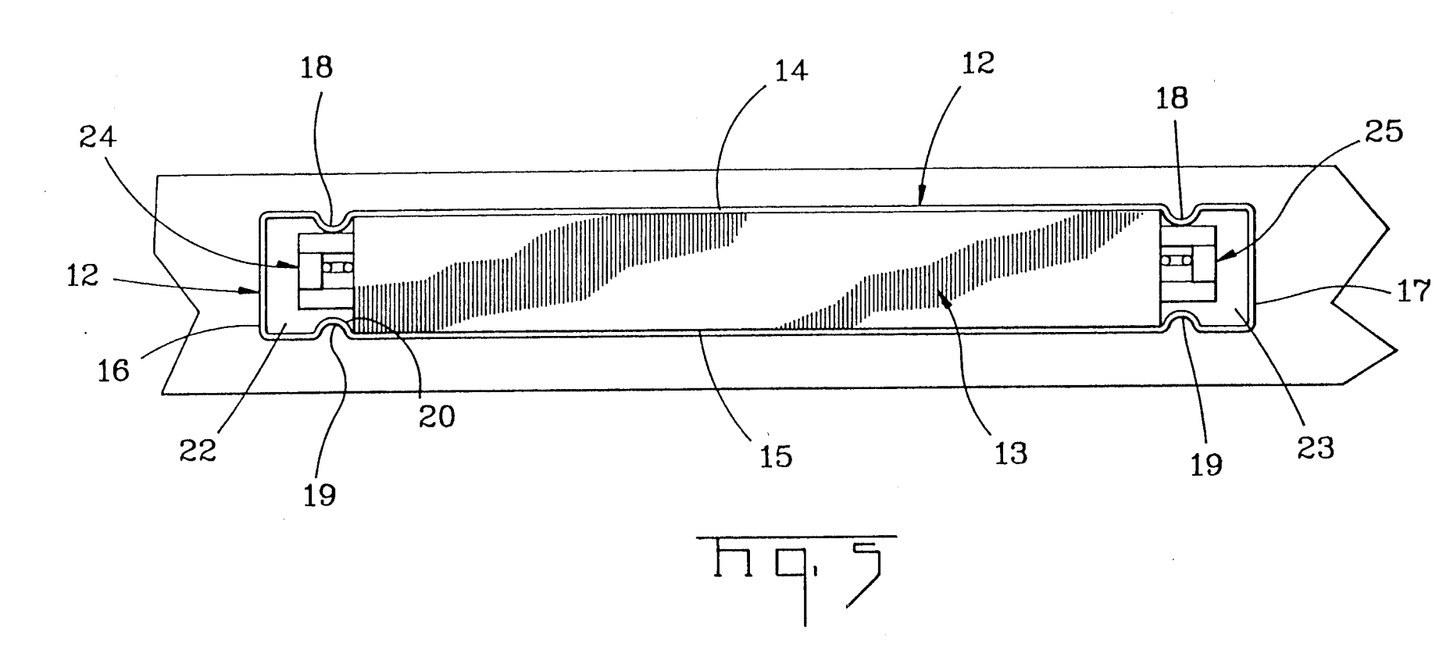
FIG. 7 is a further cross-sectional view, corresponding substantially to FIG. 6, but showing the circuit pad on the daughter board engaging the flexible electrical connector in the connector housing on the mother board after the device is fully inserted into the computer and after the pivoting latches are "snapped" into place, thereby assuring a substantially zero insertion force.
Figure 8:
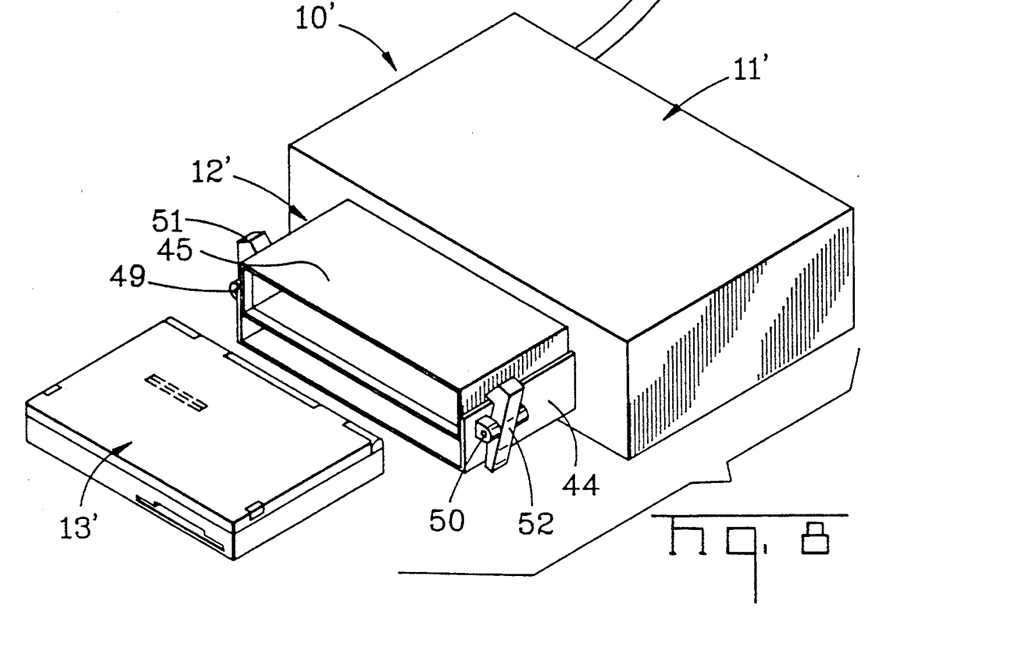
FIG. 8 is an exploded perspective view of a second embodiment of the present invention, showing the device about to be inserted into a two-piece guide housing on the computer, and wherein the latches are mounted on the guide housing for pivotal movement about respective axes which are substantially parallel to the direction in which the device is slidably received within the guide housing.

With reference to FIGS. 6 and 7, the computer 11 has a mother board 39 provided with a connector housing 40 for at least one flexible electrical connector 41. The device 13, in turn, has a daughter board 42 provided with at least one circuit pad 43 engaging the flexible electrical connector 41. The mother board 39 is disposed vertically, that is, perpendicular to the direction in which the device 13 is slidably inserted into the guide housing 12 and not parallel thereto, so that there is no danger that an edge of the daughter board 42 or the circuit pad 43 will catch or wipe against the flexible electrical connector 41; this assures the desired zero insertion force (referred to in the art as "ZIF") to prevent inadvertent damage to the flexible electrical connector 41 due to insertion of the device 13 into the computer 11 or its removal therefrom. It will be appreciated, of course, that the flexible electrical connector 41 could be on the device 13, and the circuit pad 43 in the computer 11, if desired.

With reference to FIGS. 8–14, a second embodiment of the invention is shown, wherein the docking system 10' has a computer 11' provided with a guide housing 12' for slidably receiving the device 13'. The guide housing 12' includes a substantially U-shaped upwardly-extending fixed bottom portion 44, and further includes a substantially U-shaped downwardly-extending movable top portion 45 telescopically nested within the fixed bottom portion 44 (as shown more clearly in FIGS. 11 and 12). The movable top portion 45 is resiliently biased upwardly out of the fixed bottom portion 44, as illustrated schematically by the spring 46; and the movable top portion 45 has a shelf 47 for supporting the device 13, the shelf 47 having a beveled edge 48 to facilitate slidable insertion of the device 13' therein.

The fixed bottom portion 44 of the guide housing 12' has respective bosses 49 and 50 for mounting latches 51 and 52, respectively, about pivot axes which are substantially parallel to the direction in which the device 13' is slidably inserted into the guide housing 12' and, more specifically, into the movable top portion 45 thereof. Each of the latches 51, 52 is resiliently-biased by a suitable spring (not shown) and the operation and function of the latches 51, 52 are substantially similar to the operation and function of the latches 24, 25 of the embodiment of FIGS. 1–7.

Figure 9:
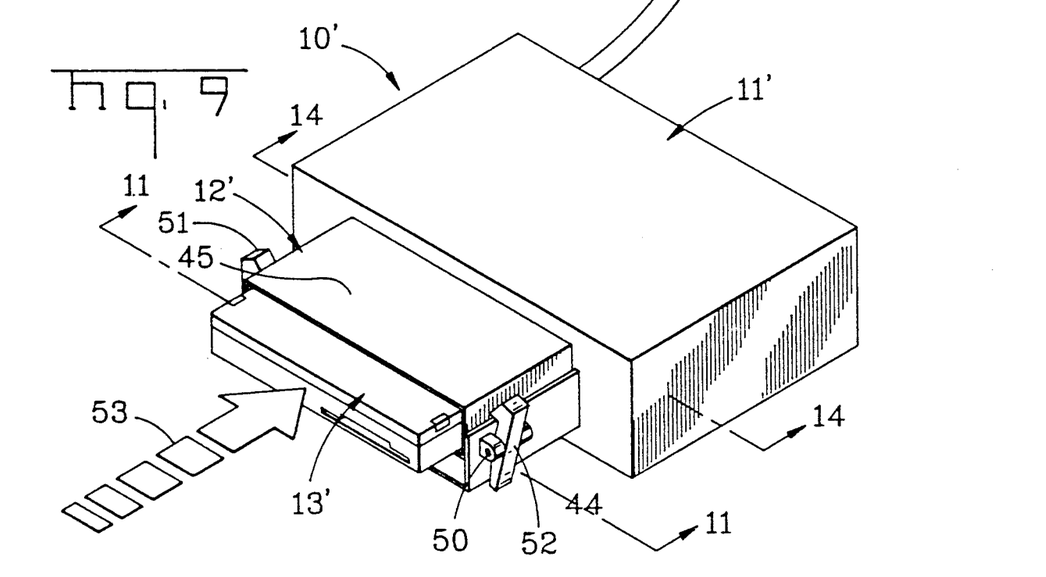
FIG. 9 is a further perspective view, corresponding substantially to FIG. 8, but showing the device being inserted into the guide housing on the computer.
Figure 10:
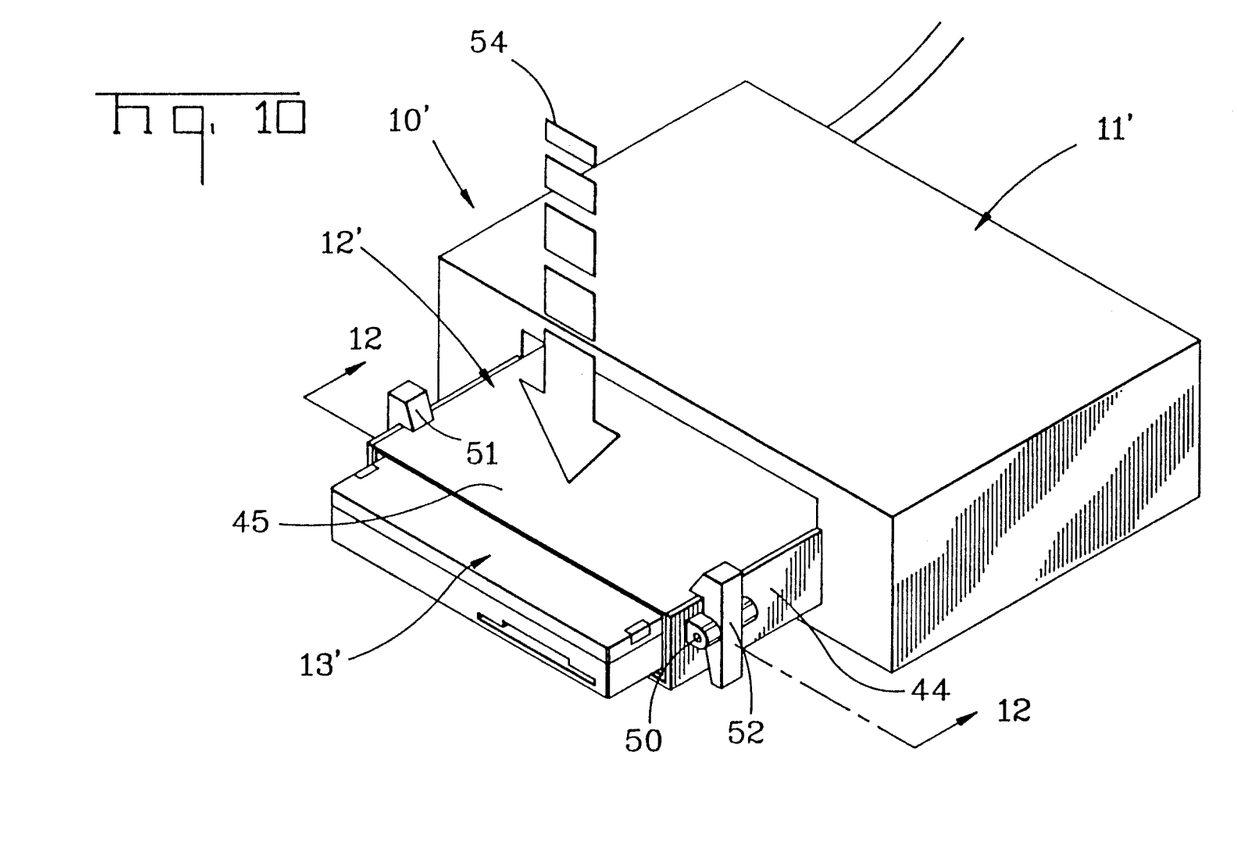
FIG. 10 is a still further perspective view, corresponding substantially to FIG. 9, but showing the device fully inserted within the guide housing, and further showing the top part of the guide housing being moved downwardly to enable circuit pads on the device to engage respective flexible electrical connectors in the computer with a substantially zero insertion force therebetween.
Figure 11:
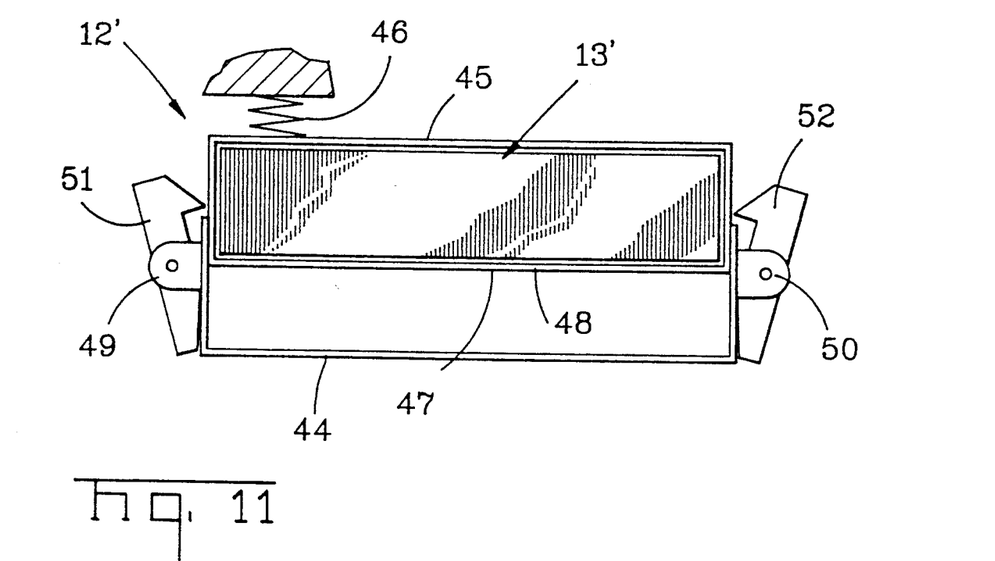
FIG. 11 is a cross-sectional view, taken along the lines 11—11 of FIG. 9, showing the construction of the two-piece guide housing on the computer, the device being received within the spring-loaded movable top portion of the guide housing, and further showing the pair of pivoting latches mounted on the fixed bottom portion of the guide housing.
Figure 12:
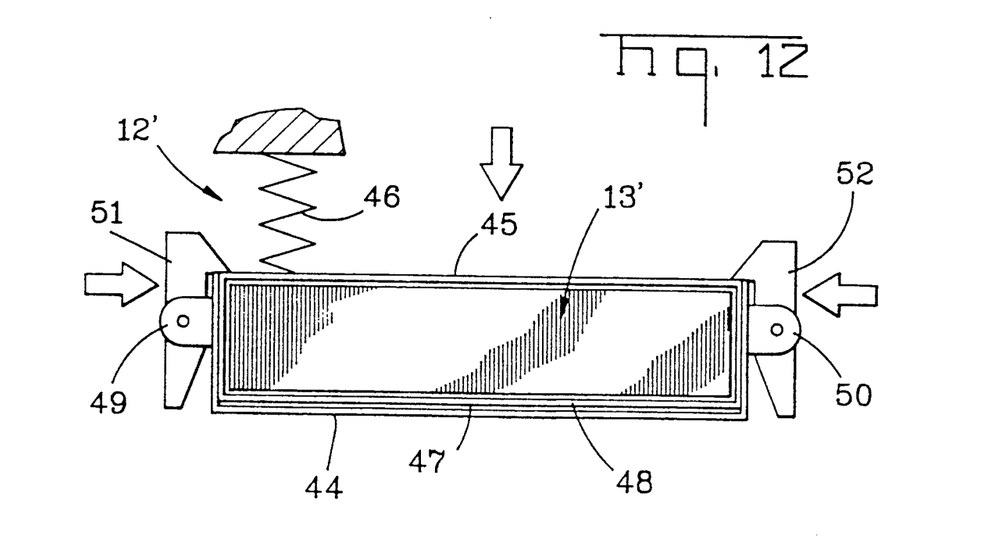
FIG. 12 is a cross-sectional view, taken along the lines 12—12 of FIG. 10 and corresponding substantially to FIG. 11, but showing the top portion of the guide housing fully nested within the fixed bottom portion thereof, and further showing the latches engaging the top portion of the guide housing.

When the device 13' is fully inserted or seated in the guide housing 12', as indicated by the arrow 53 in FIG. 9, the movable top portion 45 is pushed downwardly (against the resilient bias of the spring 46) and in a direction indicated by arrow 54 in FIG. 10. This direction is substantially perpendicular to the direction in which the device 13' is slidably inserted into the guide housing 12' on the computer 11' (arrow 53 in FIG. 9). As a result, the movable top portion 45 (and the device 13' carried therein) are substantially fully nested within the fixed bottom portion 44 of the guide housing 12', as shown more clearly in FIG. 12.

As shown more clearly in FIG. 13, the latches 51, 52 may be pivoted to release the latches 51, 52, thereby allowing the movable top portion 45 of the guide housing 12' to be lifted upwardly by the spring 46, and thereby enabling the device 13' to be slidably removed from the guide housing 12'.

Figure 14:
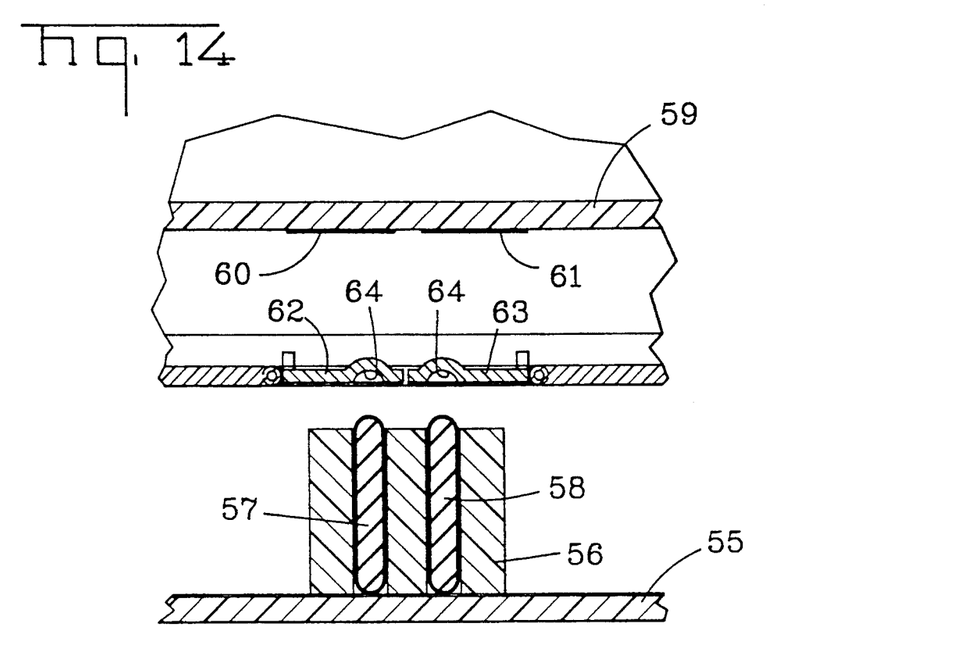
FIG. 14 is an exploded cross-sectional view, taken along the lines 14—14 of FIG. 9, and showing a pair of pivoting access doors on the device through which the connector housing (housing the respective flexible connectors in the computer) is received.
Figure 15:
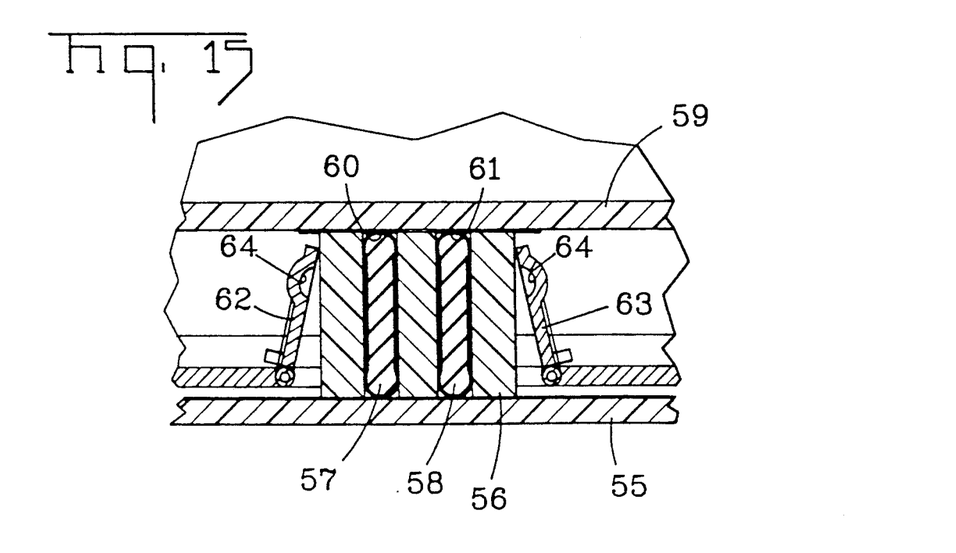
FIG. 15 is a further cross-sectional view, corresponding substantially to that of FIG. 14, but showing the pivoting access doors opened, and further showing the respective flexible electrical connectors engaging respective circuit pads on a daughter board carried by the device.
Figure 17:
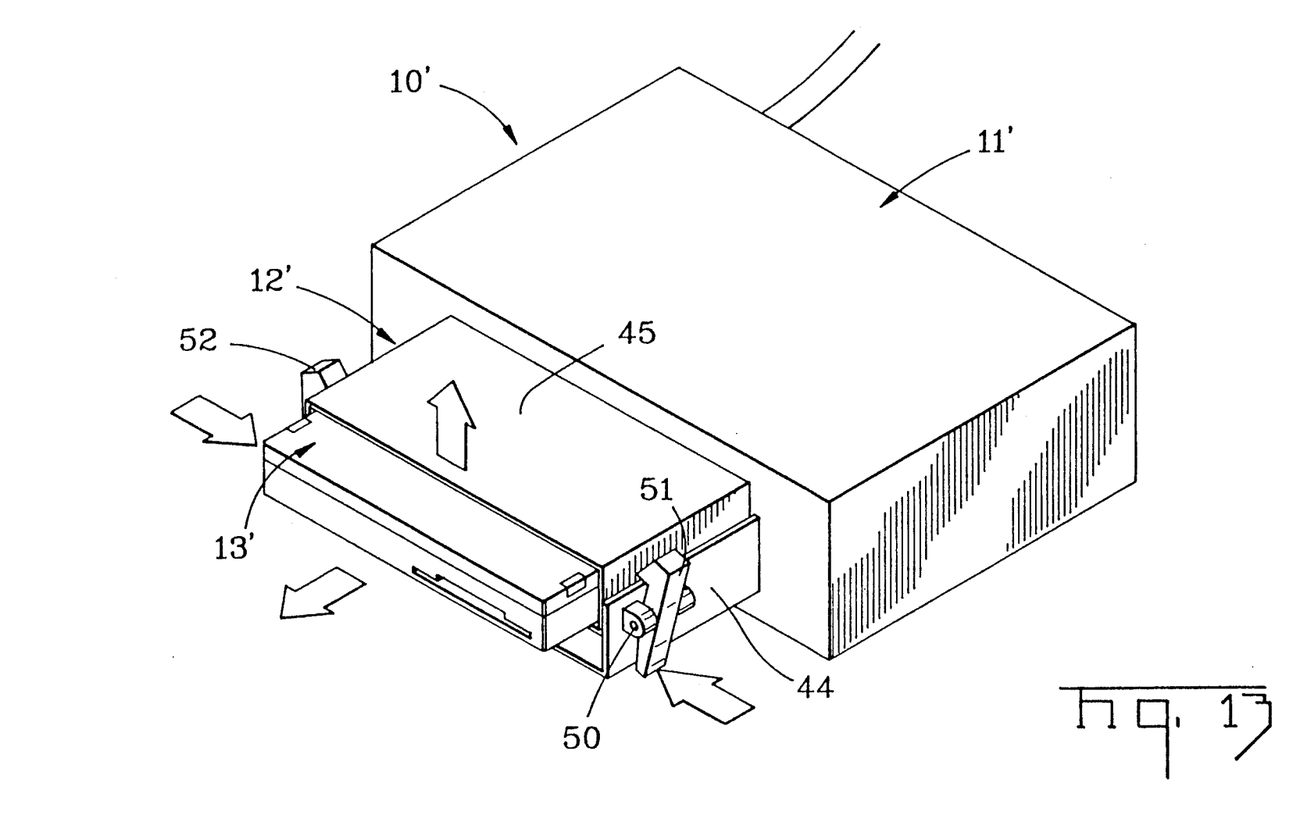

With reference to FIGS. 14 and 15, the computer 11' has a mother board 55 provided with a connector housing 56 for flexible electrical connectors 57 and 58, respectively. The device 13' has a daughter board 59 provided with circuit elements or pads 60 and 61, respectively, for engagement with the respective flexible electrical connectors 57, 58. The circuit pads 60, 61 are protected by spring-loaded pivotable access doors 62, 63 carried by the device 13'. Each of the access doors 62, 63 has an indented groove 64 providing clearance for the flexible electrical connectors 57, 58 as the connector housing 56 engages the access doors 62, 63 and swings the access doors 62, 63 open (FIG. 14) to enable the flexible electrical connectors 57, 58 to engage the respective circuit pads 60, 61 when the device 13' is fully inserted and seated within the computer 11'. Thus, and similarly to the embodiment of FIGS. 1–7, there is no relative movement or wiping action against the flexible electrical connectors 57, 58 to assure the desired substantially zero insertion force ("ZIF").

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A computer docking system, comprising a first device and a second device to be electrically interconnected thereto, a guide housing between the respective devices for slidably moving one of the said devices into a telescopic relationship therebetween, said guide housing being substantially rectangular in cross-section and is provided with top and bottom walls joined by respective side walls, wherein the top wall has a first pair of spaced-apart inwardly-projecting longitudinally-extending guide ribs formed thereon substantially parallel to the respective side walls of the guide housing, wherein the bottom wall has a second pair of spaced-apart inwardly-projecting longitudinally-extending guide ribs formed thereon substantially parallel to the respective side walls of the guide housing and aligned with the first pair of guide ribs on the top wall, wherein one of the devices has respective sides engaging the first and second pairs of guide ribs as the said one device is slidably inserted into the guide housing, and such that the respective side walls of the guide housing and the respective sides of the said one device define respective first and second chambers therebetween, wherein one of said devices is provided with at least one flexible electrical connector in the form of a flexible film having electrical circuitry thereon, and the other said device has at least one circuit element engaging said flexible electrical connector, means for assuring that the flexible electrical connector engages the circuit element with an insertion force which is substantially zero, and one of the devices having a pair of manually-releasable spring-loaded latches pivotably mounted thereon, such that the latches automatically engage the other of the devices upon completion of the slidable movement therebetween to retain the devices in their telescopic relationship, and such that the latches may be manually pivoted and released to enable the devices to be separated.

2. The computer docking system of claim 1, wherein one of said devices comprises a portable computer, and wherein the computer comprises a main frame computer having a docking station.

3. The computer docking system of claim 1, wherein one of said devices comprises an interchangeable hard disk inserted into a personal computer.

4. The computer docking system of claim 2, wherein the computer has a mother board provided with a connector housing, wherein the flexible electrical connector is in the connector housing on the mother board, and wherein the device has a daughter board carrying the circuit element.

5. The computer docking system of claim 1, wherein the sides of the device have respective laterally-projecting bosses, and wherein the pair of latches are disposed in the first and second chambers, respectively, and are mounted on the respective bosses for pivotal movement thereon about respective axes which are substantially perpendicular to the direction in which one of the devices is slidably inserted into the guide housing.

6. The computer docking system of claim 5, wherein each latch comprises an intermediate portion pivotably mounted on a respective boss, an inwardly-extending latch portion, and an outwardly-extending manually-manipulatable latch release portion, such that the latch release portions may be pivoted in a direction towards the other device to release the latches, thereby enabling said other device to be slidably removed from the guide housing.

7. The computer docking system of claim 6, further including a torsion spring mounted on each boss and disposed between the latch release portion and a respective side of the other device.

8. The computer docking system of claim 6, further including a laterally-projecting protrusion on each latch between the latch portion and the intermediate portion thereof, the protrusion engaging a respective side of the device to thereby limit the pivoting movement of the respective latch.

9. The computer docking system of claim 6, wherein the latch portion includes a first inclined surface having a first undercut surface substantially perpendicular to the direction in which the other device is slidably inserted into the guide housing, and wherein the guide housing has respective hook portions cooperating with the latch portion on the respective latches, each hook portion including a second inclined surface having a second undercut surface substantially perpendicular to the direction in which the said other device is slidably inserted into the guide housing, such that as the said other device is slidably inserted into the guide housing, the first inclined surface on the latch portion engages and rides up the second inclined surface on the hook portion, thereby pivoting the latch in one direction, and such that the first inclined surface on the latch portion rides over the second inclined surface on the hook portion and disengages therefrom, such that the first undercut surface on the latch portion engages the second undercut surface on the hook portion as the latch pivots back in a second direction opposite to the one direction and with a snap action, thereby removably securing the device within the guide housing.

10. The computer docking system of claim 1, wherein the guide housing comprises a fixed portion on the computer and projecting forwardly therefrom, the fixed portion having respective side walls, and a spring-loaded movable portion carried by the fixed portion and telescopically nested therein in a direction which is substantially parallel to the side walls of the fixed portion, the movable portion having a top wall; and wherein the respective latches are mounted on the side walls of the fixed portion for pivotal movement about respective axes which are substantially parallel to the side walls; such that the device is slidably inserted into the movable portion of the guide housing in a given direction, whereby the movable portion and the device inserted therein are moved towards the fixed portion in a direction which is substantially perpendicular to the direction in which the device is slidably inserted into the movable portion of the guide housing, thereby achieving the substantially zero insertion force as the flexible electrical connector engages the circuit element; and whereby the pivoted latches engage the top wall of the movable portion of the guide housing, such that the pivoted latches thereafter may be pivoted to disengage the top wall of the movable portion of the guide housing, thereby enabling the device to be removed therefrom.

11. The computer docking system of claim 10, wherein the computer has a mother board provided with a connector housing for the flexible electrical connector, and wherein the device is provided with a daughter board having the circuit element therein.

12. The computer docking system of claim 11, further including a pair of pivotable access doors on the device, such that the connector housing on the mother board in the computer engages and opens the access doors as the device is inserted into the computer, thereby enabling the flexible electrical connector to engage the circuit element.

* * * * *